US007908464B2

(12) United States Patent
Mittal et al.

(10) Patent No.: US 7,908,464 B2
(45) Date of Patent: Mar. 15, 2011

(54) FUNCTIONAL-LEVEL INSTRUCTION-SET COMPUTER ARCHITECTURE FOR PROCESSING APPLICATION-LAYER CONTENT-SERVICE REQUESTS SUCH AS FILE-ACCESS REQUESTS

(75) Inventors: Millind Mittal, Palo Alto, CA (US); Mehul Kharidia, Santa Clara, CA (US); Tarun Kumar Tripathy, Fremont, CA (US); J. Sukarno Mertoguno, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 777 days.

(21) Appl. No.: 11/888,411

(22) Filed: Jul. 31, 2007

(65) Prior Publication Data

US 2008/0022073 A1    Jan. 24, 2008

Related U.S. Application Data

(63) Continuation of application No. 10/248,029, filed on Dec. 12, 2002, now Pat. No. 7,254,696.

(51) Int. Cl.
*G06F 9/50* (2006.01)
*G06F 15/163* (2006.01)

(52) U.S. Cl. ........................................ 712/220; 712/225

(58) Field of Classification Search ................... 712/220, 712/225

See application file for complete search history.

(56) References Cited

U.S. PATENT DOCUMENTS 4,229,801 A    10/1980   Whipple ........................ 708/510

(Continued)

OTHER PUBLICATIONS

File, Definition, URL:http://searchexchange.techtarget.com/sdefintion/0,290660,sid43_gci212118,00.html Retrieved online Feb. 16, 2006.

*Primary Examiner* — Daniel Pan
(74) *Attorney, Agent, or Firm* — Silicon Edge Law Group LLP; Mark A. Lauer

(57) ABSTRACT

A functional-level instruction-set computing (FLIC) architecture executes higher-level functional instructions such as lookups and bit-compares of variable-length operands. Each FLIC processing-engine slice has specialized processing units including a lookup unit that searches for a matching entry in a lookup cache. Variable-length operands are stored in execution buffers. The operand length and location in the execution buffer are stored in fixed-length general-purpose registers (GPRs) that also store fixed-length operands. A copy/move unit moves data between input and output buffers and one or more FLIC processing-engine slices. Multiple contexts can each have a set of GPRs and execution buffers. An expansion buffer in a FLIC slice can be allocated to a context to expand that context's execution buffer for storing longer operands. The FLIC engine is optimized to parse, lookup, and process long strings common in content-service requests and can offload file-server requests by looking up meta-data and pointers.

22 Claims, 15 Drawing Sheets

U.S. PATENT DOCUMENTS

| | | | | |
|---|---|---|---|---|
| 4,724,517 A | | 2/1988 | May | 712/210 |
| 4,985,848 A | | 1/1991 | Pfeiffer et al. | 345/505 |
| 5,127,098 A | | 6/1992 | Rosenthal et al. | 711/202 |
| 5,148,528 A | | 9/1992 | Fite et al. | 712/210 |
| 5,428,779 A | | 6/1995 | Allegrucci et al. | 718/108 |
| 5,765,216 A | * | 6/1998 | Weng et al. | 711/214 |
| 5,768,575 A | | 6/1998 | McFarland et al. | 712/228 |
| 5,793,371 A | | 8/1998 | Deering | 345/418 |
| 5,802,366 A | | 9/1998 | Row et al. | 709/250 |
| 5,835,973 A | * | 11/1998 | Kyuma et al. | 711/220 |
| 5,842,004 A | | 11/1998 | Deering et al. | 345/501 |
| 5,854,913 A | | 12/1998 | Goetz et al. | 712/210 |
| 5,870,094 A | | 2/1999 | Deering | 345/419 |
| 5,909,565 A | | 6/1999 | Morikawa et al. | 712/200 |
| 5,974,547 A | * | 10/1999 | Klimenko | 713/2 |
| 6,028,610 A | | 2/2000 | Deering | 345/501 |
| 6,041,407 A | * | 3/2000 | Claar et al. | 713/1 |
| 6,128,641 A | | 10/2000 | Fleck et al. | 718/108 |
| 6,182,202 B1 | * | 1/2001 | Muthukkaruppan | 711/212 |
| 6,304,954 B1 | | 10/2001 | Munson | 712/215 |
| 6,349,379 B2 | | 2/2002 | Gibson et al. | 712/210 |
| 6,490,630 B1 | * | 12/2002 | Poon et al. | 709/235 |
| 6,498,571 B2 | | 12/2002 | Molloy | 341/65 |
| 6,532,012 B2 | | 3/2003 | Deering | 345/423 |
| 6,545,686 B1 | | 4/2003 | Fadden | 345/582 |
| 6,883,068 B2 | | 4/2005 | Tsirigotis et al. | 711/133 |
| 7,254,696 B2 | * | 8/2007 | Mittal et al. | 712/210 |
| 2001/0054140 A1 | | 12/2001 | Oberman et al. | 712/223 |
| 2002/0038416 A1 | | 3/2002 | Fotland et al. | 712/228 |
| 2003/0005268 A1 | | 1/2003 | Catherwood | 712/223 |
| 2004/0193835 A1 | | 9/2004 | Devaney et al. | 711/220 |

\* cited by examiner

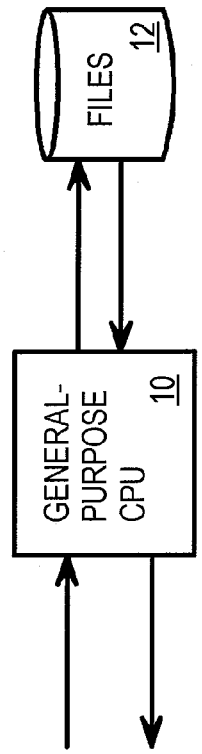

FIG. 3A
PRIOR ART

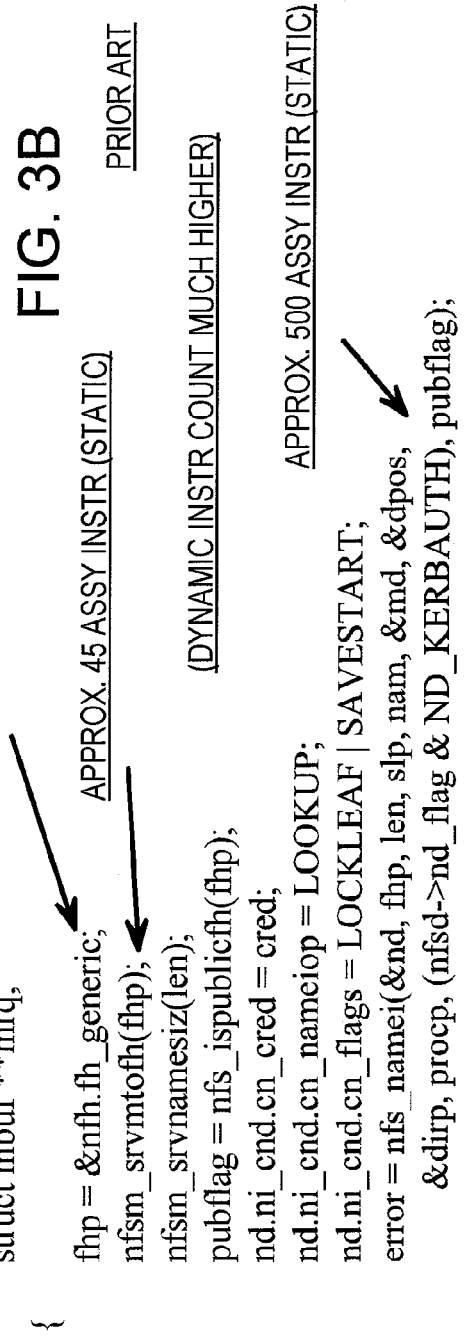

FIG. 3B
PRIOR ART

```
/*
 * nfs lookup rpc
 */
int
nfsrv_lookup(nfsd, slp, procp, mrq)
    struct nfsrv_descript *nfsd;
    struct nfssvc_sock *slp;
    struct proc *procp;
    struct mbuf **mrq;
{
    fhp = &nfh.fh_generic;          APPROX. 4 ASSY INSTR (STATIC)
    nfsm_srvmtofh(fhp);             APPROX. 45 ASSY INSTR (STATIC)
    nfsm_srvnamesiz(len);
    pubflag = nfs_ispublicfh(fhp);
    nd.ni_cnd.cn_cred = cred;
    nd.ni_cnd.cn_nameiop = LOOKUP;
    nd.ni_cnd.cn_flags = LOCKLEAF | SAVESTART;
    error = nfs_namei(&nd, fhp, len, slp, nam, &md, &dpos,
        &dirp, procp, (nfsd->nd_flag & ND_KERBAUTH), pubflag);
                                    APPROX. 500 ASSY INSTR (STATIC)
                                    (DYNAMIC INSTR COUNT MUCH HIGHER)
```

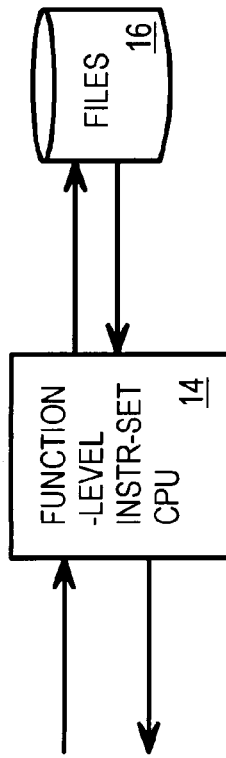

NFS LOOKUP

```
#label nfs_lookup
/* Get file handle and error out if possible */
CALL    decode_file_handle
BRNZ    P6, done /* Get name size and error out if possible */
CALL    decode_namesize
BRNZ    P6, done /* P0 points to the name in HAB already */
MOVI    P1, P4          /* <- name length */

/* Fill second lookup parameter */
MOVI    P2, PB_FSID_OFFSET
MOVI    P3, PB_FSID_LEN

MOVI    P4, PB_LOOKUP_RESULT_OFFSET
LUP     DNLC_HASH_SECTION, P0, P2, P4
```

FUNCTIONAL-LEVEL INSTRUCTION-SET COMPUTER ARCHITECTURE FOR PROCESSING APPLICATION-LAYER CONTENT-SERVICE REQUESTS SUCH AS FILE-ACCESS REQUESTS

CROSS-REFERENCE TO RELATED APPLICATION

The present application claims the benefit under 35 U.S.C. §120 of (is a continuation of) application Ser. No. 10/248, 029, filed Dec. 12, 2002, now U.S. Pat No. 7,254,696, which is incorporated by reference herein.

FIELD OF THE INVENTION

This invention relates to computer architecture, and more particularly to an instruction-set architecture using high-level or function-level instructions.

BACKGROUND OF THE INVENTION

Computers are used in a variety of applications. Networks have interconnected varied computing devices, allowing users to locate and move data across large networks such as the Internet. The data accessed is even more varied and includes multi-media, audio, video, and text in a dizzying range of content formats.

Standard protocols have been developed to access this data across a network. Protocols used to access content include Common Internet File System (CIFS) Internet Small-Computer System Interface (iSCSI), Direct Access File System (DAFS) that sequence through states, and stateless protocols such as the widely-used network file system (NFS). Accessing a file on a server is one example of a content service.

When accessing a data file on a remote server, a client application can generate a request message using one of the file-access protocols and send this message to the server in a lower-level packet such as a Transport-Control-Protocol/Internet Protocol (TCP/IP) packet. The server extracts the message, determines which file-access protocol is being used, and processes the message. A reply message is generated, perhaps containing the requested data file or a pointer to the file. The reply message can then be encapsulated in one or more lower-level packets and transmitted back to the client.

FIG. 1 shows a typical NFS request message. When a file server receives a message embedded in a packet from a client, it processes the message by examining various fields in the message. A NFS_CMD field may have to be read and decoded to determine what kind of request is being made, such as a request to read or write a file. The file server may parse the message to locate a user identifier field.

Other fields in the message can include a file handle or a file name, and other file information such as a generation number and an offset to data within the file. Different commands may require different fields in a message, and the message itself can vary substantially in length.

Several of the message fields can contain variable-length strings. The parent file handle may vary in length. Other fields such as the local file name, offset and generation number may or may not be present in some messages. Some NFS commands may simply request a pointer to the data rather than the data itself, and messages using other protocols may also be received by the file server. Thus a wide variety of request-message formats may have to be processed by a file server.

FIG. 2 shows processing of a message by a file server. A request message such as the request of FIG. 1 is received by a file server and placed in an input buffer. The file server parses the request message to locate the command and user identifier fields. From the command field, the server determines what protocol and command the message contains. The message's syntax can then be checked. The user identifier can be looked up in a user database to determine if the message is from a valid user. Other authentication information may be included in the message such as a password.

Fields in the request message that contain keys to a lookup table are extracted, and these keys are sent to one or more lookup tables to search for an entry containing the extracted key. Keys can include the file handle field, the generation number field, file-name fields, and LINUX identification-node (i-node) fields.

Once a matching entry is found in the look-up table, the results stored in the matching entry are read and the entry verified. A reply message is generated from the results and loaded into an output buffer for transmission to the client. Sometimes further processing is required, and another lookup can be performed. Data pointed to by the results can be read at the offset from the offset field. When the data is located somewhere else, a new request can be generated and sent to another server. The data may also need to be re-formatted.

Since the request message itself can contain many fields, and the fields can contain variable-length strings that must be copied and processed, the file server may require a long, complex routine of instructions to parse and process such messages.

FIG. 3A shows a file server using a general-purpose central processing unit (CPU). CPU 10 receives request messages from a network such as the Internet, and accesses data in files 12, which can be stored on a disk array. CPU 10 is often a computer that uses one or more microprocessors that execute a general-purpose instruction set. CPU 10 is designed for a wide variety of applications, and thus is not optimized for file-access processing.

FIG. 3B highlights a long routine of general-purpose instructions executed to process file-access requests. A simple file-access request such as a NFS lookup command requires execution of a long routine of general-purpose instructions.

An approximate example of a pseudo-C-code routine to perform the NFS lookup instruction is shown in FIG. 3B. Each of the C-code instructions may require several native or assembly-level instructions. For example, the instruction fhp=&nfh.fth_generic;
requires 2 assembly-code instructions while the function call:
nfsm_srvmtofh(fhp);
requires about 45 assembly-language instructions.
The final line in the pseudo C-code, the error function call, could require hundreds of static instructions. Since loops may cause static instructions to be re-executed, the dynamic instruction count can be much higher.

General-purpose instructions to input data, move data, test data are needed to process the NFS lookup command. For example, the message must be parsed to locate fields containing the parent file handle and the file name. The parent file handle and/or the parent file handle combined with the file name are then used during the lookup to locate the proper entry. Look-ups in particular may require execution of many instructions. Loops may need to be repeated, so a routine of 50 instructions may require many hundreds or more instructions to be executed.

While fewer complex instruction set computer (CISC) instructions need to be executed than reduced instruction set computer (RISC) instructions, the number of instructions executed is still quite large, perhaps being hundreds of instructions executed. General-purpose instruction sets include the x86 CISC instruction set by Intel and the PowerPC™ RISC instruction set by Motorola. Very-long instruction word (VLIW) instructions are support parallel processing, but still basically use simple instructions in parallel.

Since many CISC or RISC instructions need to be executed to process even a simple file-access command, a high instruction-fetch bandwidth is needed to fetch the many instructions in the routines. As these instructions are executed, they read and write registers in the processor core. A high bandwidth to these registers is thus also needed. Reading fields in the request message, searching the look-up table, reading data, and outputting the reply message are all I/O-intensive tasks. Most general-purpose processors are inefficient at such I/O tasks.

Parsing the message for variable-length strings such as the parent file handle or the file name may require execution of many instructions. Instructions usually move or process fixed formats of data, such as 8, 16, or 32-bit words. Long, variable-length strings may not fit inside the fixed-width general-purpose registers (GPR's) in the processor core, requiring repeated access of external memory or I/O. Locating a variable-length field in a longer message may require repeated reads and compares.

What is desired is an instruction set that is optimized for processing content-service requests including file-system requests containing variable-length strings. An instruction-set architecture that processes higher-level instructions is desired to reduce instruction-fetch and register-access bandwidth. A higher, functional-level instruction set architecture is desirable.

BRIEF DESCRIPTION OF THE DRAWINGS

FIG. 3A shows a file server using a general-purpose central processing unit (CPU).

FIG. 3B highlights a long routine of general-purpose instructions executed to process file-access requests.

FIG. 4A shows a functional-level instruction-set processor operating in a file-server application.

FIG. 4B highlights a NFS command implemented in a few functional-level FLIC instructions.

DETAILED DESCRIPTION

The present invention relates to an improvement in computer architecture. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIG. 4A shows a functional-level instruction-set processor operating in a file-server application. Functional-level instruction-set computing (FLIC) CPU 14 executes function-level instructions rather than lower-level RISC or CISC instructions. Request messages received from a network are parsed and authenticated, and any look-ups performed to located data in data files 16. Reply messages that may include data from files 16 are generated by FLIC CPU 14 and sent back over the network.

FIG. 4B highlights a NFS command implemented in a few functional-level FLIC instructions. The NFS lookup command has a parent file handle "parhandle" and a generation number of 3. The routine of FLIC instructions parses the request message for the user ID and compares the user ID to a list of valid users to authenticate the user. The parent file handle is found and used to generate a key to a lookup table. Several levels of lookup tables may need to be looked up to find the desired entry. A first lookup may use the parent file handle to locate a second-level table. Then the parent file handle and the file name are combined as the key to the second-level table during a second lookup that returns the file ha ndle. An entry from table is found and used to assemble a reply message for the file named "file_name".

The pseudo FLIC code in the example has fewer instructions than the general-purpose pseudo-C-code code of FIG. 3B, which requires execution of many native instructions in a general-purpose instruction set. In contrast, a simple FLIC routine performs the same functions in many fewer instructions. These pseudo-code examples are not intended to be fully-functional program examples, but are designed to highlight differences among code in two instruction sets.

Figure 1:
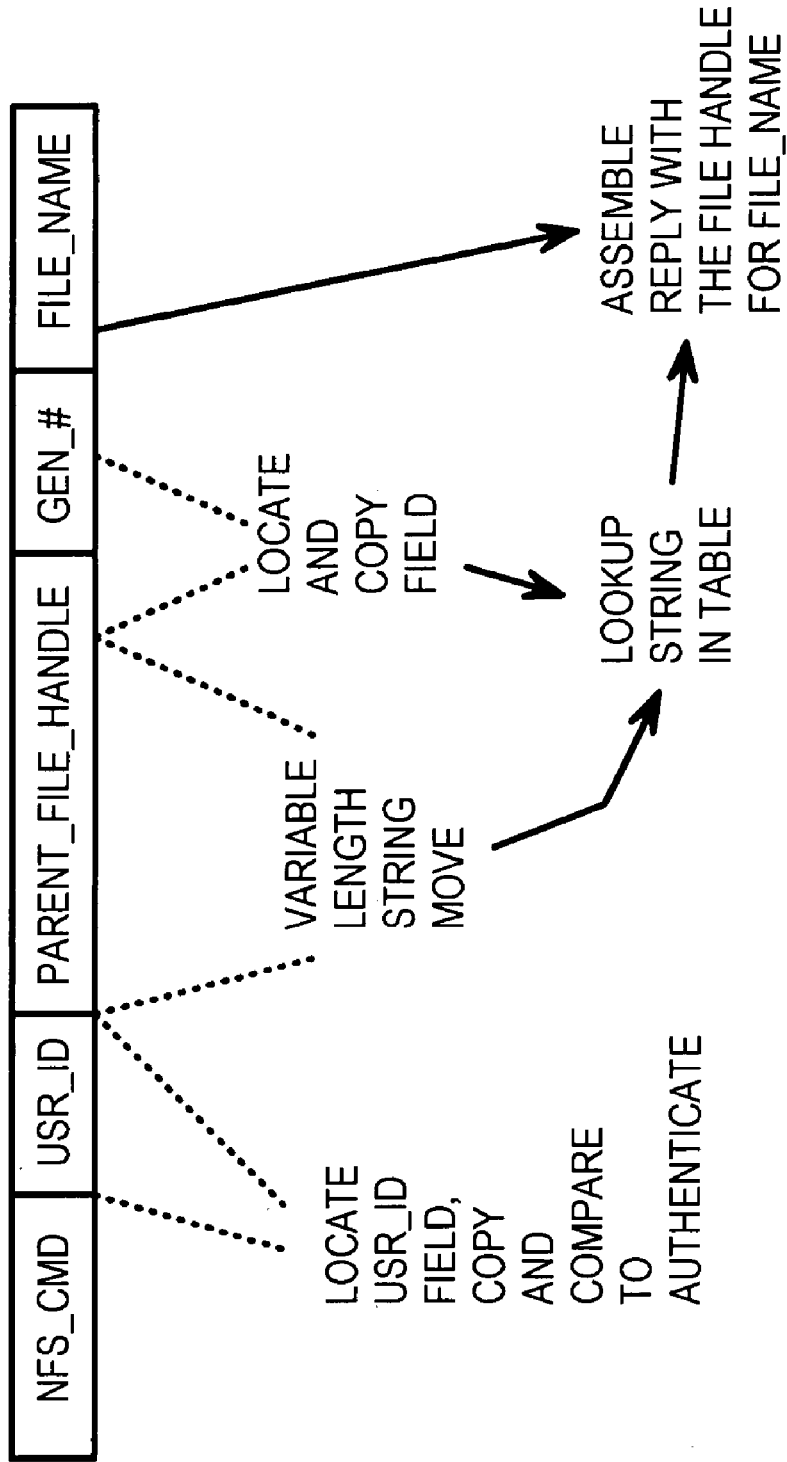
FIG. 1 shows a typical NFS message.
Figure 2:
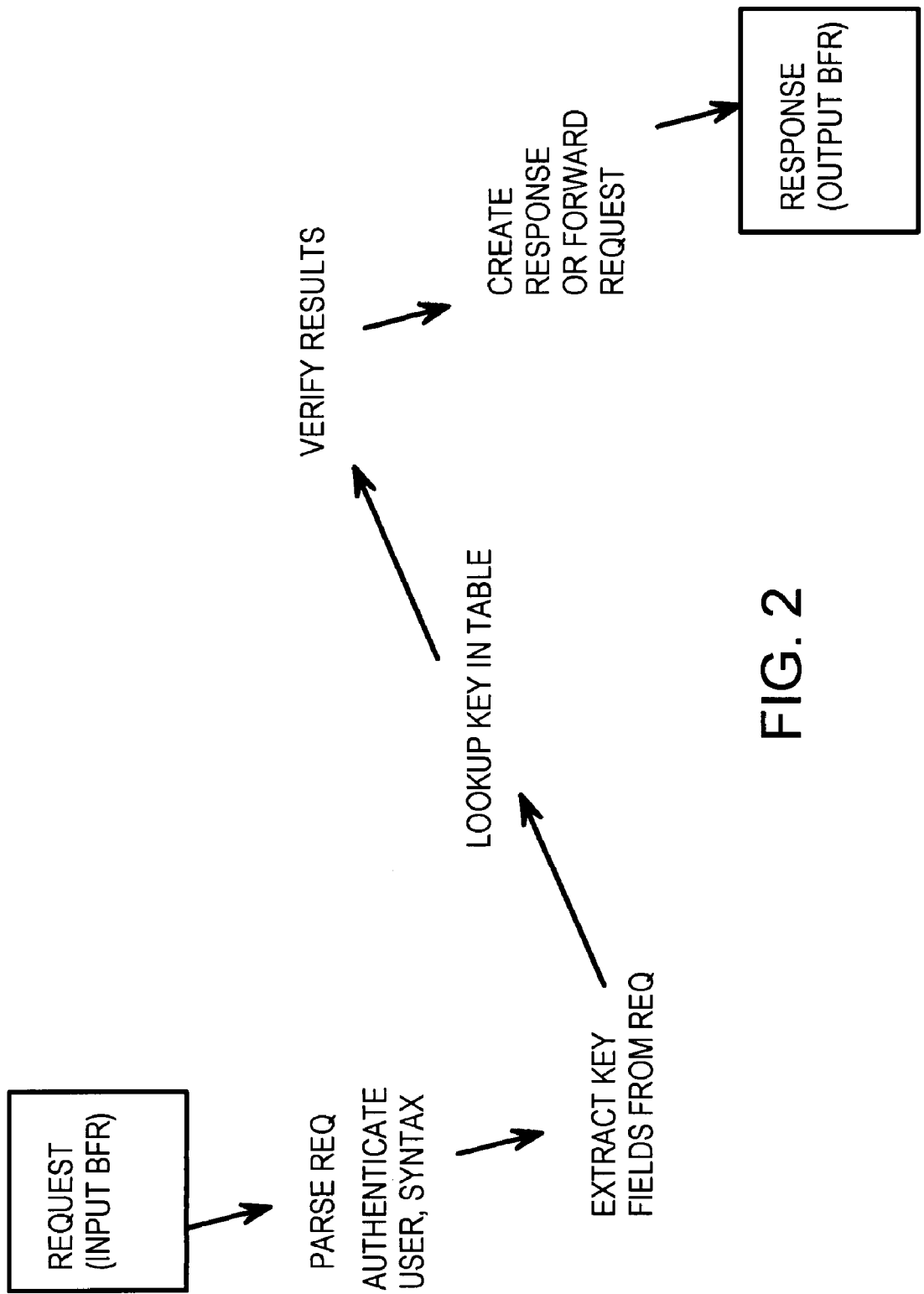
FIG. 2 shows processing of a message by a file server.
Figure 5:
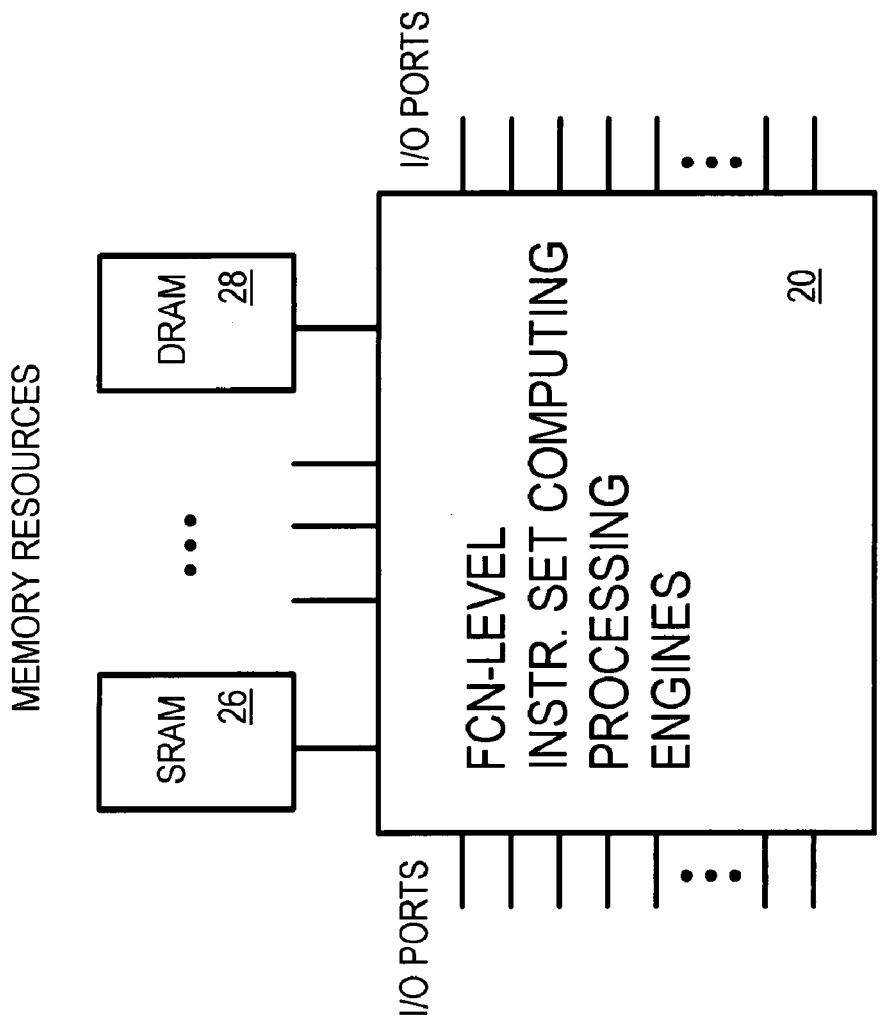
FIG. 5 is an overview-of a FLIC architecture.

FIG. 5 is an overview of a FLIC architecture. FLIC processing engines 20 contains one or more FLIC processing engines that receive requests from I/O ports, process the requests by executing routines of FLIC instructions, and generate responses on I/O ports. Memory resources can include static random-access memory (SRAM) 26 and dynamic-random-access memory (DRAM) 28.

Figure 6:
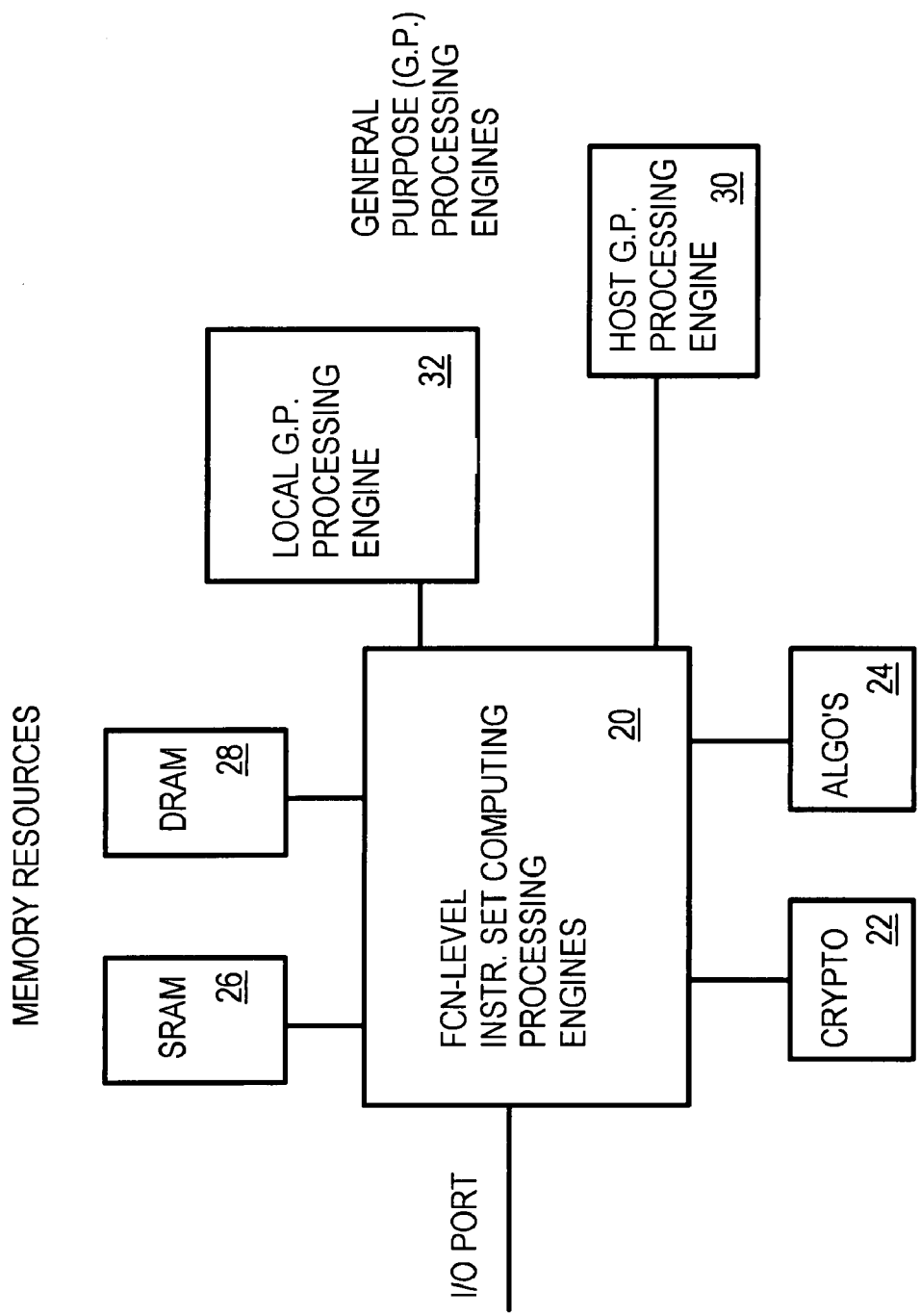
FIG. 6 shows a FLIC system.

FIG. 6 shows a FLIC system. FLIC processing engines 20 contain specialized hardware for native execution of a FLIC instruction set. Requests are received by FLIC processing engines 20 from I/O ports that can include a network interface. Memory resources available to FLIC processing engines 20 include SRAM 26 and DRAM 28.

Additional ports to FLIC processing engines 20 can connect to other processing resources such as local general-purpose processing engine 32 and host general-purpose processing engine 30. Both engines 30, 32 can be based on standard microprocessors that execute a general-purpose instruction set such as a RISC or CISC instruction set. Other general-purpose processing engines can be attached to other ports of FLIC processing engines 20.

Co-processors can also be attached through ports to FLIC processing engines 20. Cryptographic co-processor 22 encrypts and de-crypts strings sent to it by FLIC processing engines 20 using encryption keys that can be kept in a secure area. Algorithmic co-processor 24 contains a math co-processor that can efficiently perform complex mathematical operations. Other co-processors having a variety of special functions can be attached to FLIC processing engines 20 through its ports. Functions that are more efficiently executed using a general-purpose processor or a specialized co-processor can thus be offloaded by FLIC processing engines 20.

Figure 7:
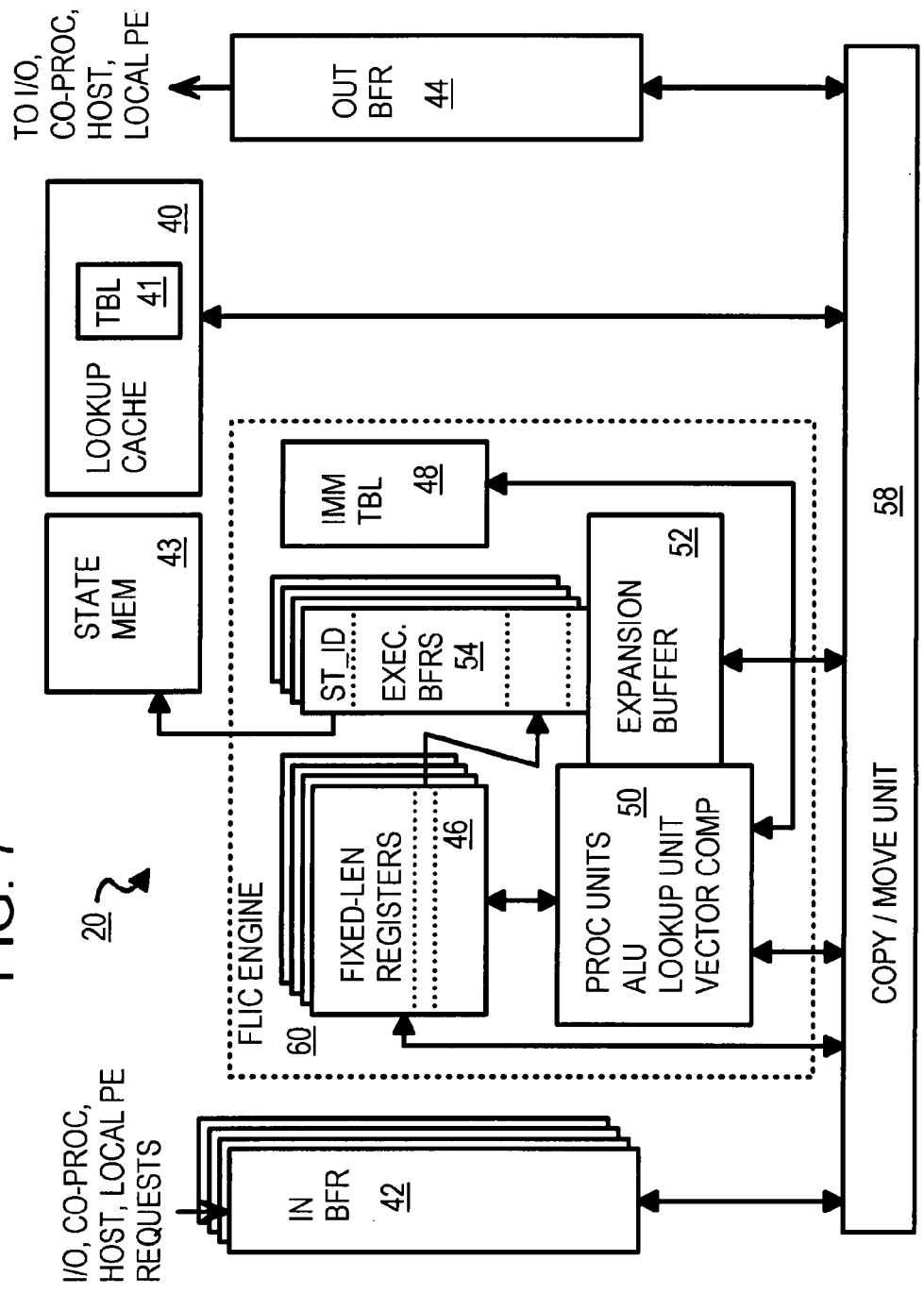
FIG. 7 is a diagram of a FLIC processor.

FIG. 7 is a diagram of a FLIC processor. FLIC processing engines 20 include one or more slices of FLIC engine 60. Each slice can process a different request.

Copy/move unit 58 moves data from input buffer 42 to FLIC engine 60 and to output buffer 44. Copy/move unit 58 also allows FLIC engine 60 to read and write memory resources such as lookup cache 40 and state memory 43, which can reside in SRAM or DRAM.

Requests from I/O, network interfaces, general-purpose processing engines, and co-processors are received into input buffer 42. These requests may include messages that have variable-length strings and require lookups, such as file-access commands. Copy/move unit 58 copies parts of requests stored in input buffer 42 to FLIC engine 60, and writes replies to output buffer 44. The replies in output buffer 44 can be sent to I/O ports, general-purpose processing engines and co-processors.

FLIC engine 60 includes a variety of specialized execution hardware, such as processing units 50. Processing units 50 can include a look-up unit that searches table 41 in lookup cache 40 for a matching entry. A vector compare unit in processing units 50 can compare variable-length strings, assisting in parsing a request message. Processing units 50 can also include an arithmetic-logic-unit (ALU), branch, bit-map processing units, security-acceleration units, and a variety of other kinds of units.

Immediate table 48 contains pre-defined constants, structure templates, and rule values that can be used by instructions. During execution, an immediate value can be copied from immediate table 48 to processing units 50 or to registers 46, 54.

Data operands can be stored in fixed-length registers 46, which are architecturally-visible general-purpose registers. Variable-length operands can be stored in execution buffers 54. A register in fixed-length registers 46 can contain a pointer to the location of the variable-length operand in execution buffers 54. Another register in fixed-length registers 46 can store the length of the variable-length operand or contain a pointer to the end of the variable-length operand in execution buffers 54.

Multiple contexts can be supported. Multiple sets of fixed-length registers 46 and execution buffers 54 can be provided, with a different register set assigned to each context. Input buffer 42 can likewise support multiple contexts with separate storage areas for each context. Rapid context-switching can be supported by switching the current input buffer, register, and execution-buffer set being used for execution.

Expansion buffer 52 provides additional storage space for execution buffers 54. When additional storage space is needed by a context to store variable-length operands, additional space can be allocated to that context's execution buffers 54 from expansion buffer 52.

A context is allocated to process a request message. One set of fixed-length registers 46 and execution buffers 54 is allocated for processing a message. A context may refer to a relevant state using a state ID. A context's current state ID can be stored in each context's execution buffer 54. The state ID is a pointer to more detailed state information contained in state memory 43. State parameters such as a current state in a sequence of states can be copied from state memory 43 to fixed-length registers 46 or execution buffers 54 when needed for execution. Both global and local state ID's can be supported.

Instruction fetch, decode, and dispatch units (not shown) can exist on each slice of FLIC engine 60, or can be shared among all slices.

Figure 8:
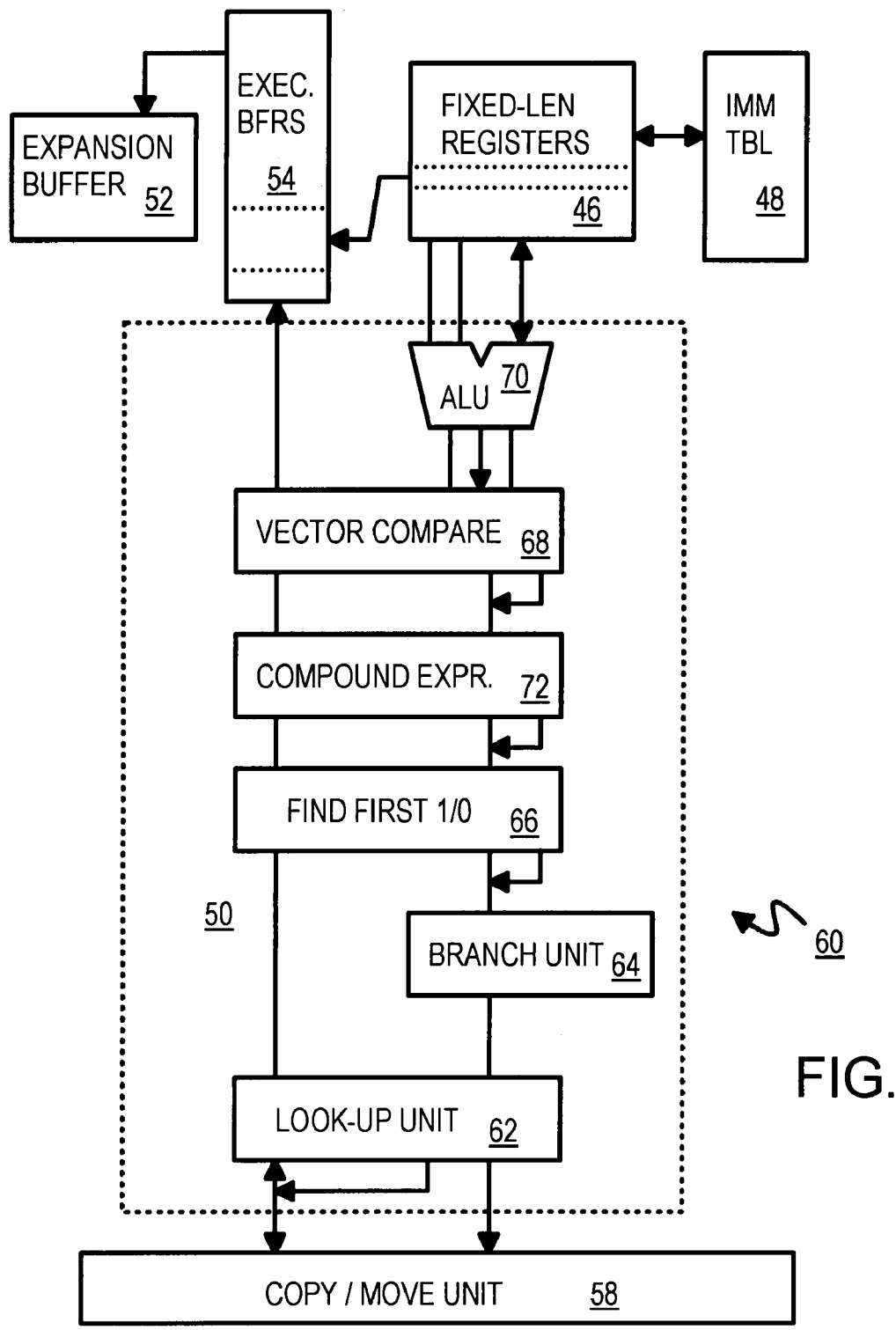
FIG. 8 shows a slice of a FLIC processing engine in more detail.

FIG. 8 shows a slice of a FLIC processing engine in more detail. Move/copy unit 58 provides a high-bandwidth copy path among the FLIC slices, including FLIC engine 60, memory, and the input and output buffers. Data from copy/move unit 58 can be written directly to fixed-length registers 46 or execution buffers 54. Processing units 50 can allow data to pass through un-altered.

Registers in fixed-length registers 46 can contain a pointer to a variable-length operand in execution buffers 54, and a length of the operand. A context can gain additional storage space for execution buffers 54 by allocating space from expansion buffer 52. Immediate table 48 contains pre-defined constants.

Processing units 50 can be connected to move/copy unit 58, execution buffers 54, immediate table 48, and fixed-length registers 46 in a variety of ways. ALU 70 can read and write operands from fixed-length registers 46 or immediate table 48. ALU 70 can perform additions, subtractions, and simple logical operations on fixed-length or variable-length operand.

Vector compare unit 68 can receive operands from ALU 70, fixed-length registers 46, or execution buffers 54 and can write back to move/copy unit 58, execution buffers 54, or fixed-length registers 46. Vector compare unit 68 compares two operands and outputs the result of the compare. The operand length can be variable. Compound expression unit 72 can perform complex logical operations on variable-length operands. Find first unit 66 searches for the first one or first zero in a variable-length operand. Branch unit 64 can resolve conditional branches by resolving logical operations.

Look-up unit 62 performs specialized look-up instructions. A look-up table in a lookup cache memory is searched for a matching key value. The key value can be variable length and can be a combination of fields, such as a file handle concatenated with a generation-number. A pointer to the matching entry is returned, allowing the matching entry to be directly copied to the output buffer by move/copy unit 58.

Figure 9:
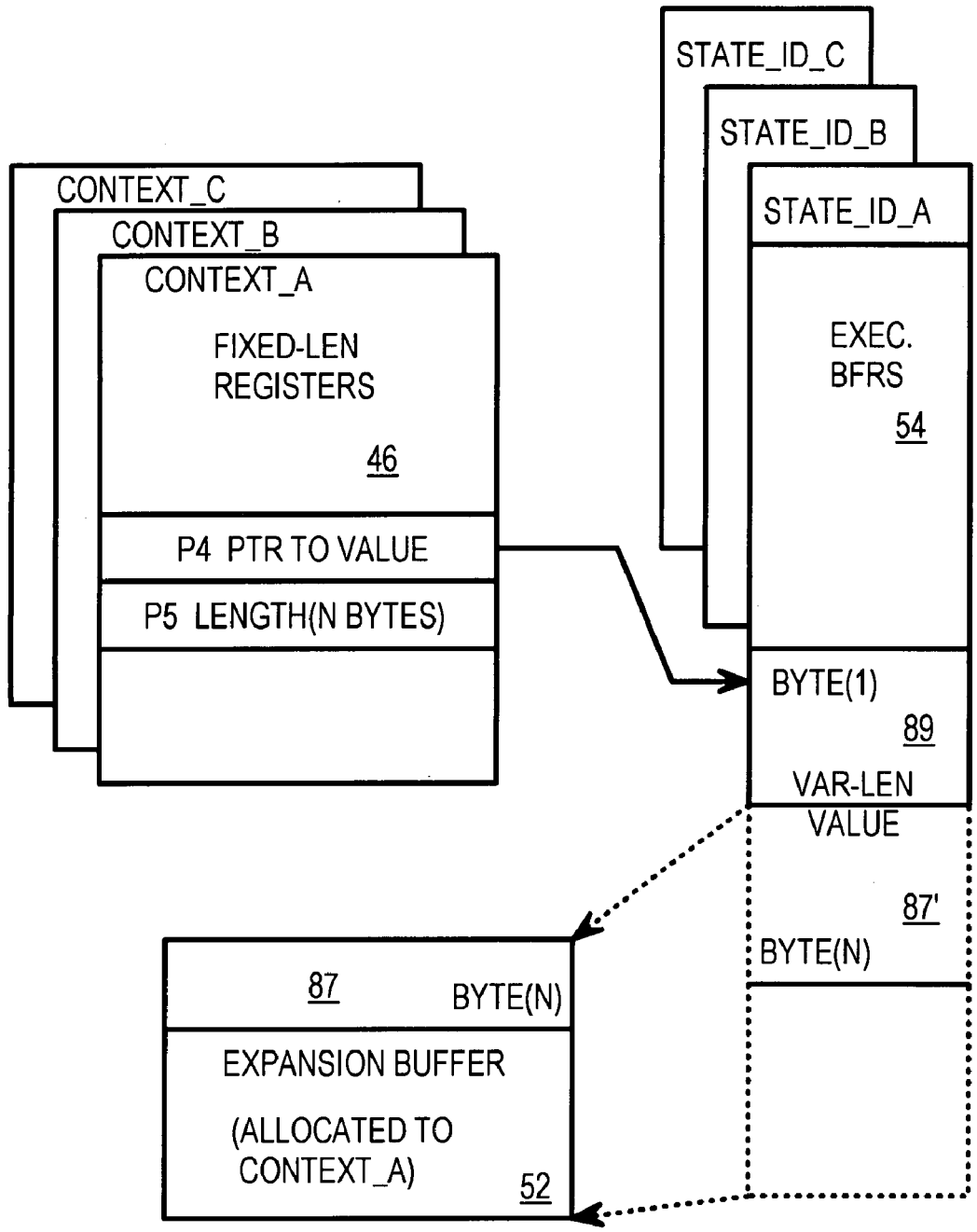
FIG. 9 highlights register-indirect addressing of a variable-length operand stored in the execution buffer and expansion buffer.

FIG. 9 highlights register-indirect addressing of a variable-length operand stored in the, execution buffer and expansion buffer. Fixed-length registers 46, execution buffers 54, and expansion buffer 52 reside on a FLIC engine. A number of fixed-length registers, such as 32 32-bit registers, are provided by fixed-length registers 46 for each context. Only registers from the current context are accessible by instructions being executed at any time.

Each context is allocated a set of execution buffers 54. A pre-defined location in each context space, such as the first location, can hold the state identifier. This state ID can be used as a pointer to more state information contained in a state memory. Context switching changes the set of fixed-length registers 46 and the area of execution buffers 54 are accessed by instruction execution. In this example, context A is currently being executed.

Additional space for a context's execution buffers 54 can be allocated from expansion buffer 52. For example, execution buffers 54 may assign 2 Kbyte of space per context. When a context needs more than the 2 KB allocated, some or all of expansion buffer 52 can be allocated to that context. In this example, an additional 1 KB is allocated to context A, so context A has a total of 3 KB of execution space.

Register 4 of fixed-length registers 46 contains pointer P4, which is a value that points to a variable-length operand in execution buffers 54. Pointer P4 points to the first byte BYTE (1) of the operand.

The next register in fixed-length registers 46, register 5, contains the length P5 of the variable-length operand. This length P5 indicates the last byte BYTE(N) of the variable-length operand. BYTE(N) is actually stored in expansion buffer 52 which has been allocated to context A.

The first part of the variable-length operand, starting with BYTE(1), is in portion 89, which is in execution buffers 54. However, the variable-length operand overflows the end of execution buffers 54. The second part of the variable-length operand, portion 87, is stored in expansion buffer 52. From a memory-address viewpoint, portion 87' appears to be contiguous with portion 89, even though portion 87 physically is stored in expansion buffer 52 rather than execution buffers 54.

The functional-level instructions can contain operand fields that identify which register pair in the fixed-length registers contains the pointer and length to the variable-length operand in the execution buffers. Thus variable-length operands are directly accessed by the functional-level instructions.

Figure 10:
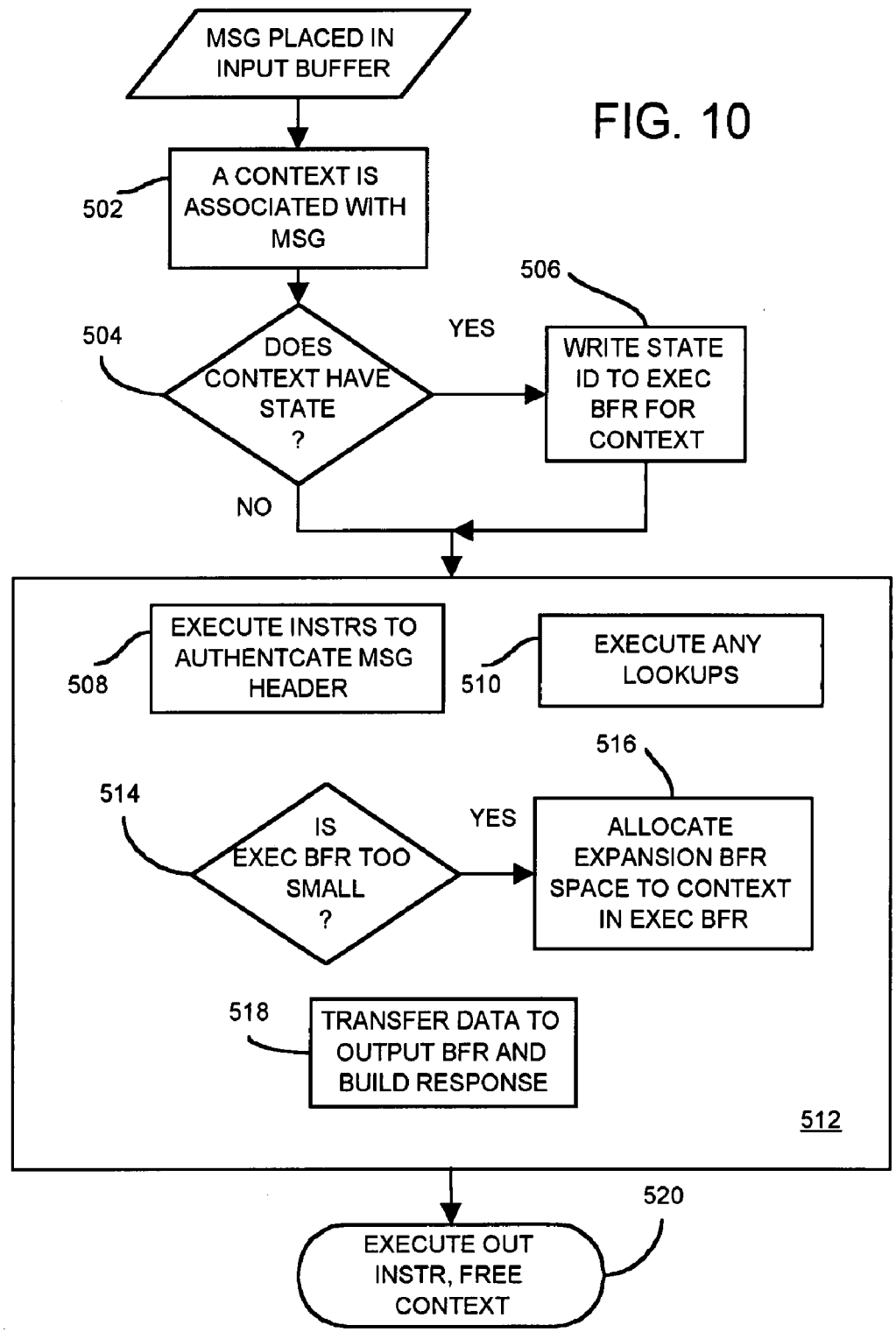
FIG. 10 is a flowchart showing message processing by a FLIC processor.

FIG. 10 is a flowchart showing request message processing by a FLIC processor. Request messages are placed in the input buffer by the host processor or other general-purpose processing engines, co-processors, or by a network interface such as a TCP/IP stack or other I/O. A request message is read from the input buffer and a context is allocated for processing the message, step 502. One of the FLIC engine slices is assigned to process the message, and a set of registers and buffers allocated for the context.

Some request messages are stateful while others are stateless. If a state is associated with the message, step 504, then the state's identifier, the state ID, is written to the state ID location in the execution buffer for that context, step 506. The state ID points to a location in the state memory that has more information about the state used by the context.

A routine of FLIC instructions is executed to process the request message. The command field, which is normally at the beginning of the message, can be read to determine the type of request message, and to select a particular routine of FLIC instructions to process the message. Routine 512 can include a variety of FLIC instructions in different sequences. FLIC instructions such as copy/move with validate, vector compare, and compound expressions can be executed to parse the message, check the message's or header's syntax for errors, and authenticate the user, step 508.

Various lookups may need to be performed, such as searching for a matching file handle in a translation or lookup table. Multiple levels of tables may need to be looked up. Pointers to meta-data or data can also be searched for in lookup tables. The FLIC lookup instruction can be executed to efficiently search a lookup table, step 510.

During execution of FLIC instructions, additional storage space may be required. For example, a variable-length string may be read from the input buffer when the routine discovers that the execution buffers are too small to hold the variable-length string, step 514. Additional storage space can be allocated to the context's execution buffer from the expansion buffer, step 516. This additional space expands the storage space available to the context to store and process the long string.

A response message is constructed, step 518, with the processing results. The response message may be constructed directly in the output buffer, or may be constructed in the fixed-length registers or expansion buffer and copied to the output buffer using the move/copy unit. Parts of the response may be pointers, meta-data, or data found by a lookup, and may be copied directly from the lookup table to the output buffer.

Once the response has been constructed, processing of routine 512 can end. An output instruction can be executed to allow the response in the output buffer to be transmitted, step 520. The output buffer can transmit the response to the host processor, other general-purpose processing engines, co-processors, the network stack or interface, or to other I/O ports. The message's context can be freed in the FLIC engine and another instruction from the input buffer processed.

Figure 11A:
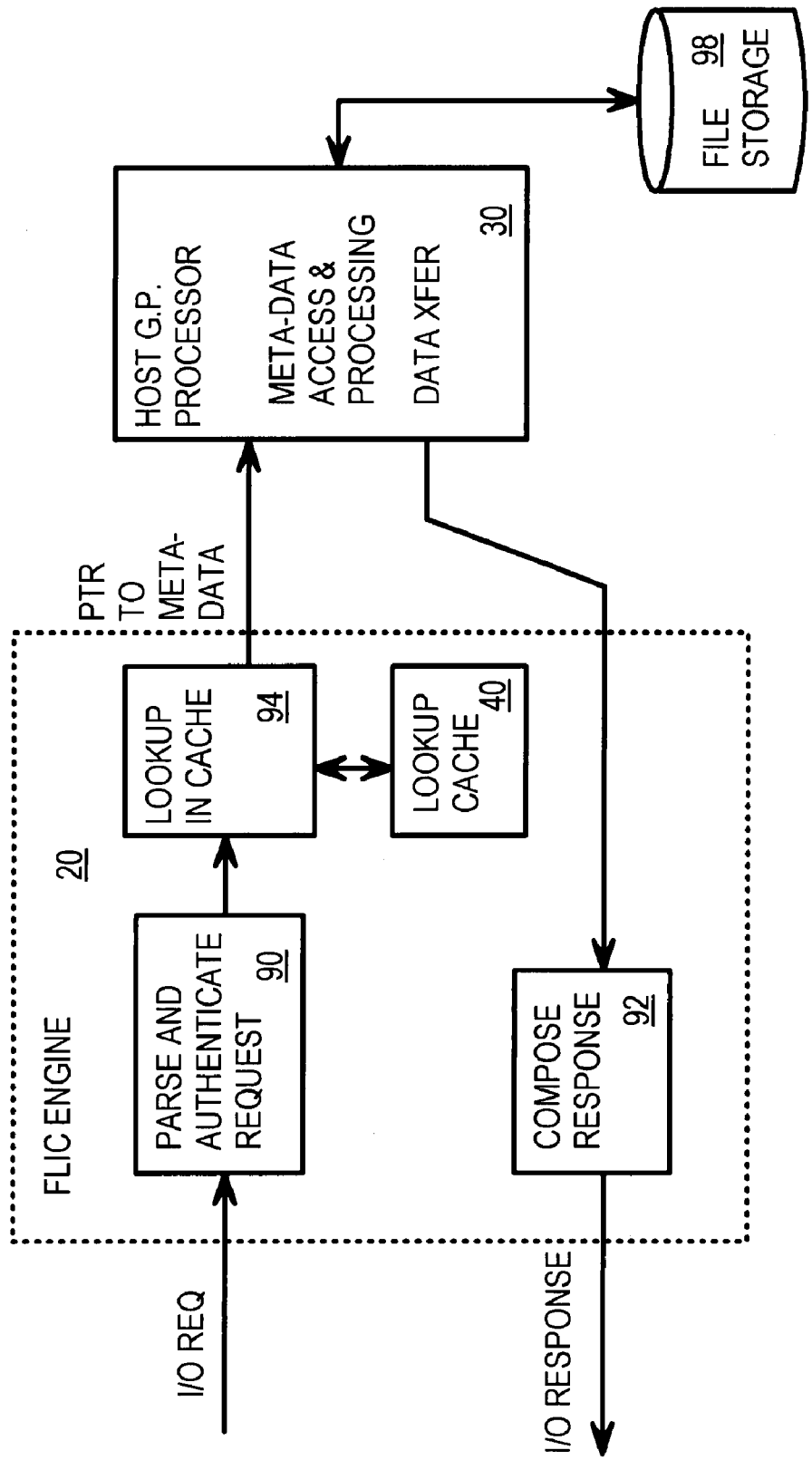
FIGS. 11A-C show file-access requests being offloaded by a FLIC engine for a host processor.
Figure 11B:
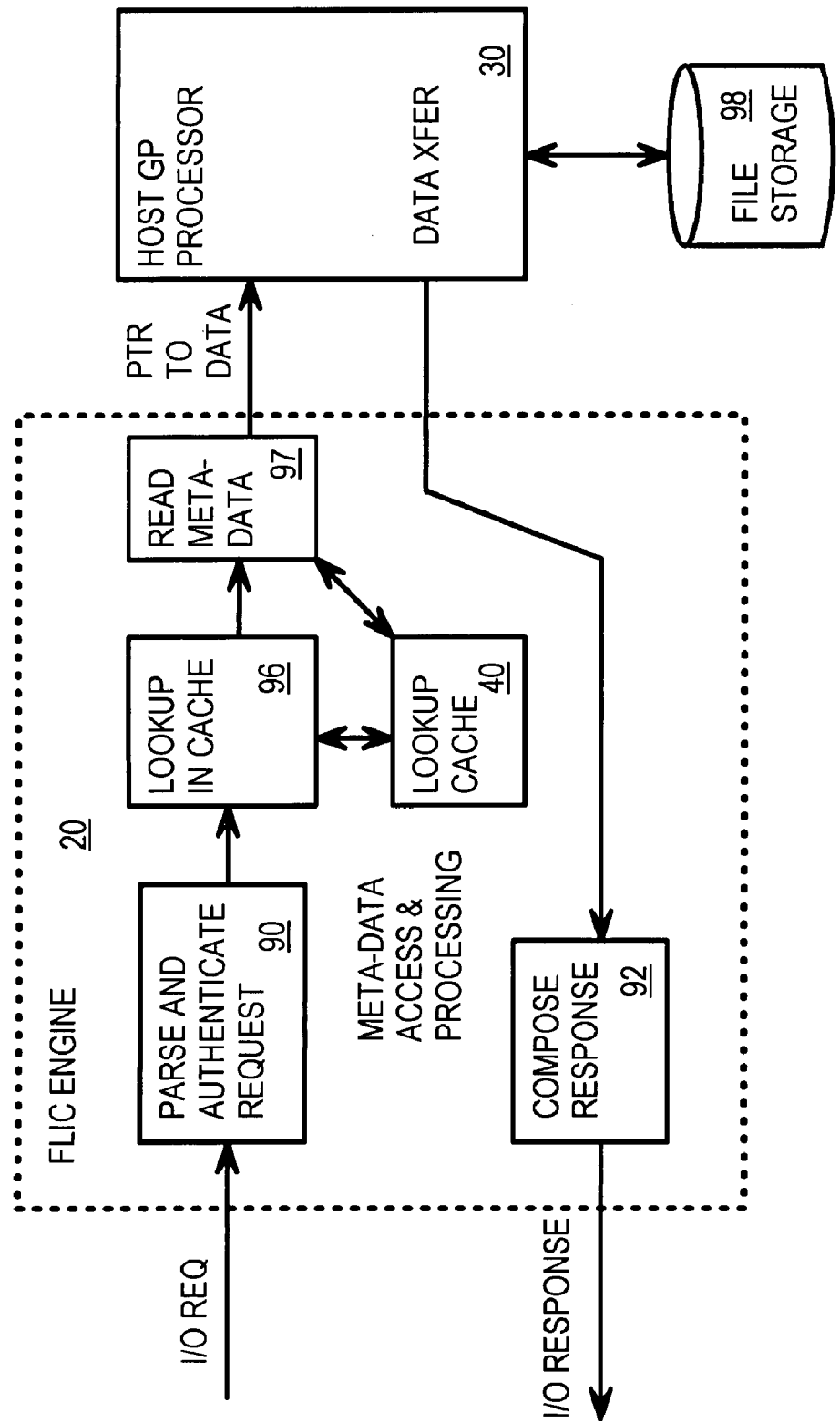
Figure 11C:
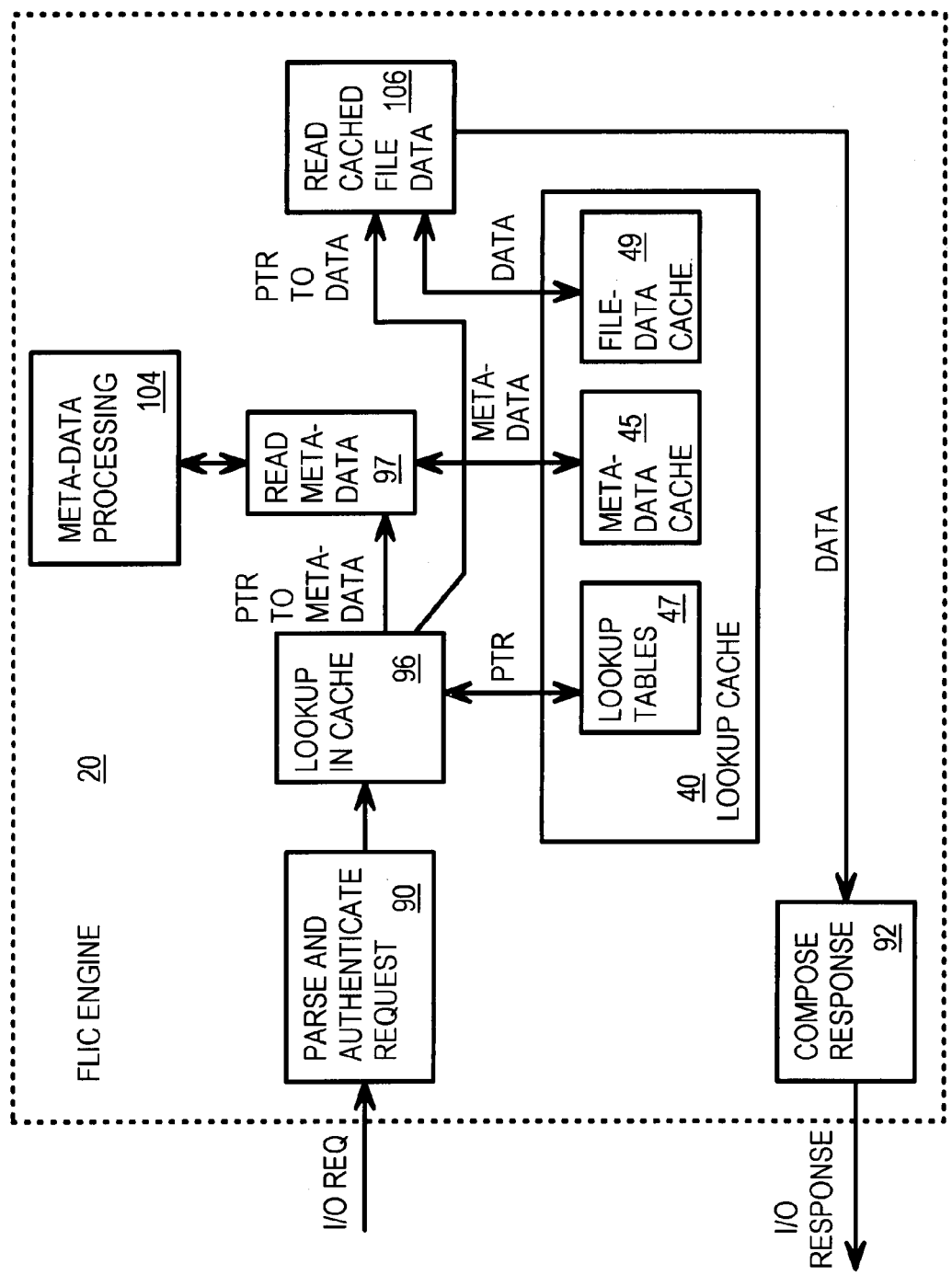

FIGS. 11A-C show file-access requests being offloaded by a FLIC engine for a host processor. In FIG. 11A, a request is received on an I/O port to FLIC processing engine 20. This request could be a message containing a file-access command such as an NFS read command that is received from a network such as the Internet.

FLIC processing engine 20 parses the request message and authenticates the user and message, process 90. Lookup 94 is a lookup that obtains a pointer to the meta-data. Lookup cache 40 contains a table of pointers to meta-data. A matching entry in lookup cache 40 is found that provides a pointer to the meta-data. A new message is created to host general-purpose processing engine 30. The new message contains the pointer to the meta-data and parts of the original request. Some reformatting may be performed. The new message is sent to host general-purpose processing engine 30.

Host general-purpose processing engine 30 receives the new message from FLIC processing engine 20 and processes the new message using routines of general-purpose instructions. Files 98 can be a hard disk or storage network that is accessed at a location indicated by the pointers from FLIC processing engine 20 to read the meta-data. The meta-data contains attributes of the data such as read-only, modified and created dates, etc. and may also contain a pointer to the data itself. This data pointer can be used by host general-purpose processing engine 30 to read the data from files 98.

The meta-data and/or data can then be returned directly to the network or I/O requester, or can be returned to FLIC processing engine 20. Host general-purpose processing engine 30 can generate a message back to the I/O requester or to FLIC processing engine 20 that contains the meta-data and/or data read from files 98. FLIC processing engine 20 then generates response message 87 back to the I/O or network requestor.

In the example of FIG. 11A, FLIC processing engine 20 offloaded authentication and the initial lookup of the pointer to the meta data, reducing the workload of host general-purpose processing engine 30.

In FIG. 11B, a request is received on an I/O port to FLIC processing engine 20. FLIC processing engine 20 parses the request message and authenticates the user and message, process 90. Lookup 96 is a lookup that obtains a pointer to the meta-data from lookup cache 40. Several lookups may be required. For example, a top-level table may first be searched for a pointer to a second-level table. Then the second-level table is looked up for the pointer. This results in a variable latency that can depend on the number of levels of tables that need to be looked up.

The pointer to the meta-data is then used for meta-data read 96. The meta-data read can be verified and processed by FLIC processing engine 20, such as verifying that the user has sufficient read access privilege or permissions for the particular file being requested. Other verifications can include denying write access to a read-only file, etc.

The matching entry in lookup cache 40 points to the meta-data and may contain a pointer to the data itself. A new message is created to host general-purpose processing engine 30 that contains the pointer to the data and parts of the original request that are modified to indicate that authentication and some verification has already been performed. The new message may also contain parts of the meta-data found in lookup cache 40, such as file attributes. The new message is sent to host general-purpose processing engine 30.

Host general-purpose processing engine 30 receives the new message from FLIC processing engine 20 and processes the new message using routines of general-purpose instructions. Files 98 are accessed at a location indicated by the data pointer from FLIC processing engine 20. This data pointer can be used by host general-purpose processing engine 30 to read the data from files 98.

The data can then be returned directly to the network or I/O requester, or can be returned to FLIC processing engine 20. Host general-purpose processing engine 30 can generate a message back to the I/O requestor or to FLIC processing engine 20 that contains the data read from files 98. FLIC processing engine 20 then generates response message 92 back to the I/O or network requestor. The meta-data read by FLIC processing engine 20 can be included in the response along with the data from host general-purpose processing engine 30.

In the example of FIG. 11B, FLIC processing engine 20 offloads authentication, table lookups, meta-data read, and meta-data verification, reducing the workload of host general-purpose processing engine 30. A data pointer obtained from the lookup was sent in the new message to host general-purpose processing engine 30.

In FIG. 11C, FLIC processing engine 20 is able to completely offload the I/O request. FLIC processing engine 20 parses the request message and authenticates the user and message, process 90. Lookup 96 first obtains a pointer to the meta-data by reading lookup tables 47 in lookup cache 40. Lookup tables 47 may have several levels of nesting, requiring a lookup for each level.

This meta-data pointer is then used by meta-data read 97 to read the meta-data from meta-data cache 45 in lookup cache 40. Meta-data cache 45 is a data structure in memory that may be a separate structure from lookup tables 47. Meta-data processing 104 verifies the meta-data. Lookup 96 again reads lookup tables 47, and a pointer to the data obtained. This data pointer can be used for data read 106 to file-data cache 49, that returns the data requested. File-data cache 49 is a data structure in memory that may also be a separate structure from lookup tables 47. The data and/or meta-data can then be inserted into response message 92 for return to the I/O requestor.

Since the data and meta-data were found in the local caches of FLIC processing engine 20, host general-purpose processing engine 30 did not have to be accessed. FLIC processing engine 20 offloaded the entire request processing in the example of FIG. 11C.

The request may be simple request, such as the NFS get-attributes command, which is a request to just read the file attributes. Then the data pointer is not needed, and reading the data can be skipped. When the meta-data is found in the cache in FLIC processing engine 20, even when the data itself is not present, the request can still be entirely processed by FLIC processing engine 20 without accessing host general-purpose processing engine 30. Other simple NFS requests that can often be processed entirely by the FLIC processing engine 20 include the NFS lookup, access, and read-link commands, or read when file-data is also cached. Some offloaded requests such as attribute reads may only access meta-data, and not the data itself. Other offloaded requests might include write requests that are terminated early, such as for a buffered write, or when a permission is violated, such as an attempt to write to a read-only file or to a file for a different user or workgroup that the user does not have access permission.

While read requests may be offloaded by FLIC processing engine 20, write request may still have to be sent to host general-purpose processing engine 30, since files 98 have to be modified. A delayed write-back scheme could be used, or some other coherency scheme.

Figure 12:
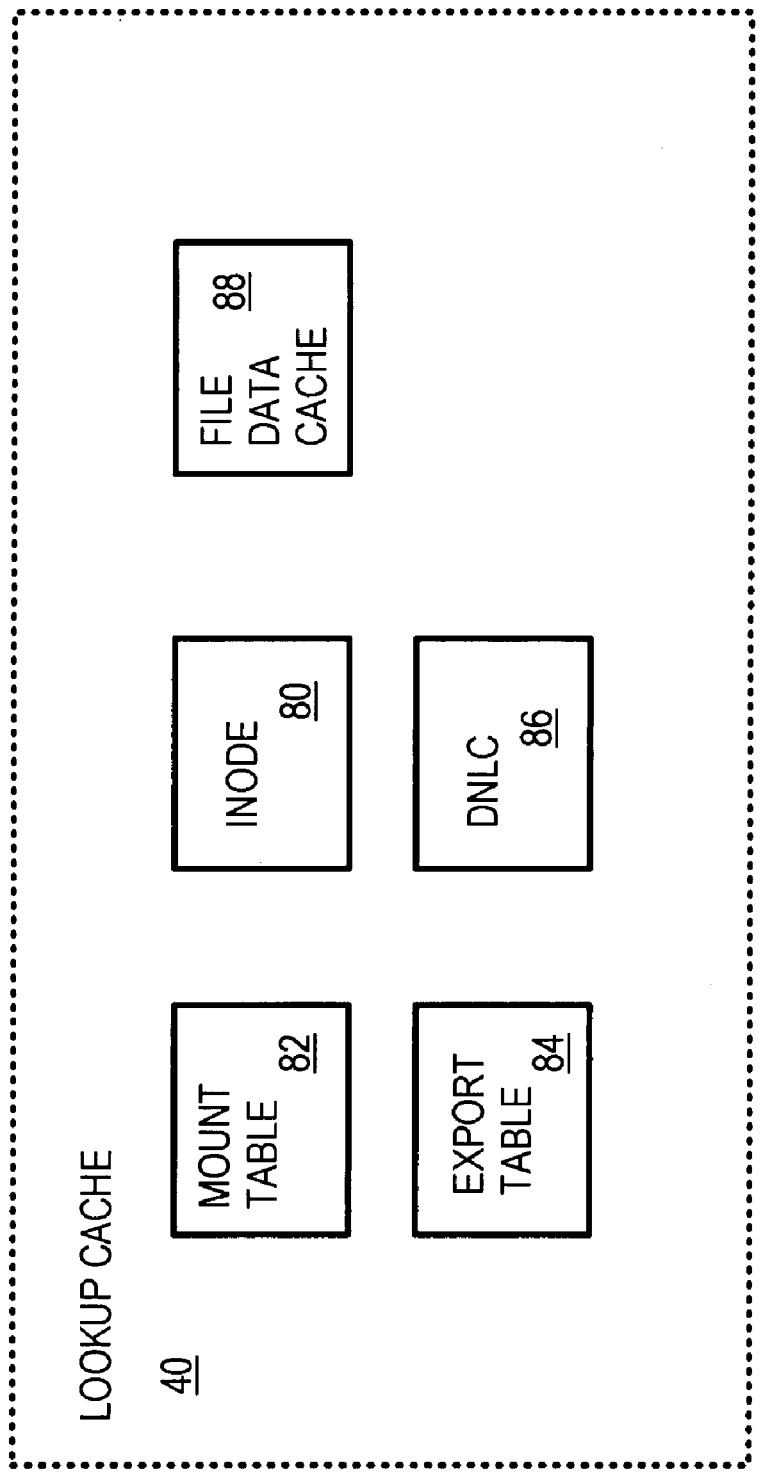
FIG. 12 shows lookup tables in the lookup cache.

FIG. 12 shows lookup tables in the lookup cache. Lookup cache 40 can exist in DRAM or DRAM or other memory or combination. A hashing scheme such as the MD5 scheme may be used to select address bits for groups or buckets of entries in the tables. One of the entries in a bucket, such as the least-recently-used entry in a bucket, can be selected for replacement when no matching entries are found in the bucket. Other cache organizations may also be used.

A variety of lookup tables can be kept for the different protocols that can be used by messages. Multiple tables are used for the different types of data structures, and for the different levels of lookup for nested tables. Mount table 82 can be accessed when the request message has an NFS command. Export table 84 provides exported mount points for the file system. Directory Name Lookup Cache (DNLC) table 86 contains entries that can be looked up using DNLC keys. Inode table 80 contains LINUX identification-node (i-node) entries that are looked up using an i-node key.

File-data cache 88 contains a cache of file data that can be used to satisfy file-data requests. Larger memory sizes may contain more space for file-data while smaller memories may not include file-data cache 88.

Alternate Embodiments

Several other embodiments are contemplated by the inventors. For example FIFO buffers, pipeline and staging registers can be added at various points. Separate FIFO buffers may exist for each I/O, processing engine, co-processor, or network interface. Multiple buffers may be used for each source or destination, such as a data FIFO that contains the message and another FIFO that stores the offset to the message and the message length. Direct-memory access (DMA) may be used to move request or response messages. The network interface can be a simple network stack or a more sophisticated network processor such as a TCP/IP offload engine (TOE).

The instruction-set architecture can be implemented in a variety of ways. Some FLIC instructions can be executed using micro code while other FLIC instructions may use only hardware for execution. More complex tasks such as lookup cache management can be handled by the host general-purpose processor or other processors executing general-purpose instruction sets. Extensions may be added to the instruction set.

While a file-server application has been highlighted to show the power of the FLIC architecture, the FLIC architecture may be used for many other applications. More generalized content-services applications can deliver content that is not necessarily in a file format but could include streaming data. Other applications can include intrusion-detection that performs searches for variable-length bit patterns, data-base request processing that performs complex parsing of requests, lookups of meta-data, etc. Extensible-markup-language XML request parsing and processing is another possible application. Messages may be received in and re-formatted to a number of formats, such as XML and External data representation XDR.

Some lookup caches may store only pointers or meta-data and not the data itself, while larger caches may store data or meta-data as well. The lookup cache can store variable-length tags that are matched with the variable-length keys. A variety of cache organizations and associations can be used. Partial matching may be supported by masking off some bits so that all bits in the variable-length tags do not have to match to find a matching entry.

Since several levels of lookup tables may need to be looked up, and the memory may be shared, resulting in contention, the instruction latency can be variable. Transfer of variable-length operands is also inherently a variable-latency operation, since longer operands may require more bus cycles to transfer the data over the move/copy unit or over a fixed-width bus.

The number of operands processed by a FLIC instruction can also be variable. One of the operands specified may be a pointer to a list of operands, rather than specify a single operand. For example, a FLIC add operation may have specify a pointer in a register that points to a list of operands. The FLIC add instruction then adds all of the operands together, requiring many cycles on a 2-input adder as each operand on the list is added to a running sum. Thus not only are the operands variable-length, but the number of operands in an instruction can be variable. This can further lead to variable latency of instruction execution.

The FLIC processing engine can be integrated as a stand-alone integrated circuit, or may be integrated with other devices such as the host general-purpose processor, buffers, or memories. Several instances of the FLIC engine can be integrated together and share the same copy/move unit. Additional hardware resources may be added to the FLIC processing engine, such as by adding functional units to perform more specialized data manipulations or to perform more complex string searches or operations. Operations normally performed by co-processors could be included as functional units or the entire co-processor could be integrated on the same chip, but still use the input and output buffers to access the FLIC processing engine.

Figure 13:
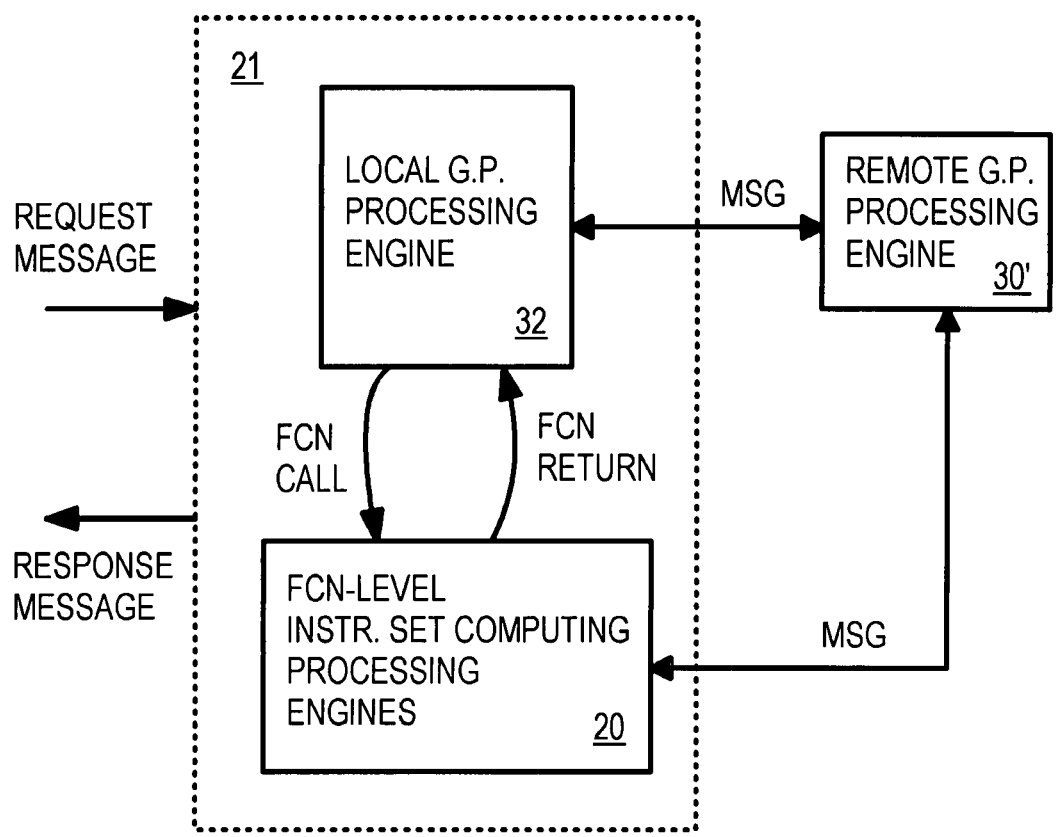
FIG. 13 shows an alternate embodiment where the FLIC engine is tightly coupled to the local general-purpose processor.

FIG. 13 shows an alternate embodiment wherein the FLIC engine is tightly coupled to the local general-purpose processor.

In this software environment, local general-purpose processing engine 32 has high-level control of processing, but makes function calls to FLIC processing engines 20 for functions that can be processed more efficiently by the functional-level instructions than by general-purpose instructions. For example, complex parsing of the request message could be performed by FLIC processing engines 20.

When FLIC processing engines 20 finishes its routine, it executes a return instruction, passing results back to local general-purpose processing engine 32. Some of the results may also be directly written to a memory or output buffer. Thus FLIC processing engines 20 are tightly coupled to local general-purpose processing engine 32.

Local general-purpose processing engine 32 can also send messages to remote general-purpose processing engine 30' for further processing. FLIC processing engines 20 can also send and receive messages from remote general-purpose processing engine 30'. FLIC processing engines 20 and local general-purpose processing engine 32 are tightly coupled and can reside together on system 21, which might be implemented on a single silicon chip or set of chips.

Remote general-purpose processing engine 30' may be a host such as a file-system host, or may have other functionality such as hosting a database, monitoring or controlling a physical device or environment, or some other functionality. Remote general-purpose processing engine 30' can act as a master to local general-purpose processing engine 32 or as a peer. Some or all of the remote or host functionality can be performed by local general-purpose processing engine 32. Some systems may not have a remote processor.

Messages can refer to both local and global states. Several messages can be processed in the same context, and various methods can be implemented to impose ordering rules for message dependencies.

Speculative execution can be supported. For example, a result from a lookup instruction can be further processed before the matching entry is verified to be valid or coherent. The FLIC processing engine can sent the result to the host general-purpose processor for final verification or further processing if the result was not valid.

The number and sizes of registers can be varied, such as providing 32 or 64 64-bit registers, and the execution buffers and expansion buffer can have other sizes. Data paths can be 32 bits, 64 bits, or other widths. Wider registers could store both the pointer and length of a variable-length operand, rather than requiring two registers.

The registers and buffers could be part of a larger physical memory structure on a chip. Longer variable-length operands can be sent in multiple cycles over the fixed-width busses. The variable-length-operand length stored in the fixed-length registers can be a length in bytes or words or some other measure, or can be a pointer to the last byte in the variable-length operand. The operand can be reversed in direction so the last byte has the most-significant-bit (MSB) rather than the least-significant-bit (LSB). The pointer to the first byte could really point to the last byte or word, or could point to the byte before the first byte or the byte after the last byte.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:
1. A file server comprising:
an offload device coupled to receive file-access requests from a network, the offload device including:
a memory, the memory allocated by the offload device, the memory storing lookup tables having entries, one or more of the entries comprising a tag storing a first variable-length string;
a plurality of processing units for executing functional-level instructions, the functional-level instructions including instructions operating on operands of variable-length, the processing units including a lookup unit;
wherein one of the processing units includes a plurality of processing slices operating in parallel, each processing slice processing a request, the request seeking to access a file, the request including a second variable-length string, the request having a context allocated by the offload device, the context comprising:
an execution buffer that stores a variable-length operand, the variable-length operand representing the second variable-length string;
a first fixed-length register storing a pointer that indicates a location for the variable-length operand;
a second fixed-length register storing an operand-length that indicates a length for the variable-length operand or storing a pointer that indicates the end of the variable-length operand;
wherein a functional-level instruction identifies the variable-length operand stored in the execution buffer by specifying a first register number for the first fixed-length register and a second register number for the second fixed-length register, the lookup unit searches the lookup tables for an entry, and the first variable-length string stored in the tag for the entry matches the variable-length operand.

2. The file server of claim 1, further comprising:
an output buffer that stores a response to the request, the response including one or more attributes for the file, the processing units generating the response by executing a routine of functional-level instructions;
wherein the response is output to the network and the offload device completes the processing of the request and outputting of the response without accessing a processor that runs a general purpose instruction set.

3. The file server of claim 1, wherein the second variable-length string includes a file handle or a file name.

4. The file server of claim 1, wherein the lookup tables further store pointers to meta-data, the lookup unit obtaining from the lookup tables a pointer to meta-data pertaining to the file.

5. The file server of claim 4, further comprising:
an output buffer storing a response to the request, the response including the pointer to meta-data.

6. The file server of claim 1, wherein the lookup tables further store meta-data, the lookup unit obtaining from the lookup tables meta-data pertaining to the file.

7. The file server of claim 6, further comprising:
an output buffer storing a response to the request, the response including the meta-data.

8. The file server of claim 1, further comprising:
an input buffer that stores the request; and
an output buffer that stores a response to the request, the response including a third variable-length string, the processing units generating the response by executing a routine of functional-level instructions.

9. The file server of claim 8, wherein the input buffer includes plural storage areas, and a storage area is assigned to the context.

10. A file server comprising:
a central processing unit (CPU) running an instruction set including a plurality of instructions to operate a file system that organizes a plurality of files and meta-data pertaining to the files; and
an offload device coupled to receive file-access requests from a network, the offload device comprising an output buffer coupled to the CPU; a memory, the memory allocated by the offload device, the memory storing lookup tables having entries, one or more of the entries comprising a tag storing a first variable-length string; processing units for executing functional-level instructions belonging to a functional-level instruction set, the functional-level instructions including instructions operating on operands of variable-length, the processing units comprising a lookup unit; wherein each of the processing units includes a plurality of processing slices operating in parallel, each processing slice processing a request, the request seeking to access a file, the file being one of the plurality of files, the request including a second variable-length string, the request having a context allocated by the offload device, the context including:
an execution buffer that stores a variable-length operand, the variable-length operand representing the second variable-length string;
a first fixed-length register storing a pointer that indicates a location for the variable-length operand;
a second fixed-length register storing an operand-length that indicates a length for the variable-length operand or storing a pointer that indicates the end of the variable-length operand;
wherein a functional-level instruction identifies the variable-length operand stored in the execution buffer by specifying a first register number for the first fixed-length register and a second register number for the second fixed-length register, the lookup unit searches the lookup tables for an entry, and the first variable-length string stored in the tag for the entry matches the variable-length operand.

11. The file server of claim 10, wherein the lookup tables further store pointers to meta-data, the lookup unit obtaining from the lookup tables a pointer to meta-data pertaining to the file;
wherein the output buffer stores a partial response to the request, the partial response including the pointer to meta-data pertaining to the file;
wherein the CPU receives the partial response from the output buffer and executes routines of instructions for further processing of the partial response.

12. The file server of claim 11, further comprising:
non-volatile file storage means for storing the plurality of files, the non-volatile file storage means coupled to the CPU;
wherein the further processing of the partial response includes accessing meta-data pertaining to the file at a location in the non-volatile file storage means, the location indicated by the pointer to meta-data pertaining to the file.

13. The file server of claim 10, wherein the lookup tables further store pointers to data, the lookup unit obtaining from the lookup tables a pointer to data for the file;

wherein the output buffer stores a partial response to the request, the partial response including the pointer to data for the file;

wherein the CPU receives the partial response from the output buffer and executes routines of instructions for further processing of the partial response.

14. The file server of claim 13, further comprising:

non-volatile file storage means for storing the plurality of files, the non-volatile file storage means coupled to the CPU;

wherein the further processing of the partial response includes accessing data for the file at a location in the non-volatile file storage means, the location indicated by the pointer to data for the file.

15. The file server of claim 10, wherein the second variable-length string includes a file handle or a file name.

16. A file server comprising:

an offload device processing a request received from a network, the request seeking to access a file, the offload device including:

a memory, the memory allocated by the offload device, the memory storing lookup tables having entries, one or more of the entries comprising a tag storing a first variable-length string;

a plurality of processing units for executing functional-level instructions, the functional-level instructions including instructions operating on operands of variable-length, the processing units including a lookup unit;

an execution buffer allocated by the offload device, the execution buffer storing a variable-length operand, the variable-length operand representing a second variable-length string, the second variable-length string extracted from the request;

a first fixed-length register storing a pointer that indicates a location for the variable-length operand;

a second fixed-length register storing an operand-length that indicates a length for the variable-length operand or storing a pointer that indicates the end of the variable-length operand; and an output buffer that stores a response to the request, the response including one or more attributes for the file, the processing units generating the response by executing a routine of functional-level instructions;

wherein a functional-level instruction identifies the variable-length operand stored in the execution buffer by specifying a first register number for the first fixed-length register and a second register number for the second fixed-length register, the lookup unit searches the lookup tables for an entry, the first variable-length string stored in the tag for the entry matches the variable-length operand, and the response is output to the network and the offload device completes the processing of the request and outputting of the response without accessing a processor that runs a general purpose instruction set.

17. The file server of claim 16, wherein the second variable-length string includes a file handle or a file name.

18. The file server of claim 16, wherein the lookup tables further store pointers to meta-data, the lookup unit obtaining from the lookup tables a pointer to meta-data pertaining to the file.

19. The file server of claim 18, further comprising;

an output buffer storing a response to the request, the response including the pointer to meta-data.

20. The file server of claim 16, wherein the lookup tables further store meta-data, the lookup unit obtaining from the lookup tables meta-data pertaining to the file.

21. The file server of claim 20, further comprising;

an output buffer storing a response to the request, the response including the meta-data.

22. The file server of claim 16, further comprising:

an input buffer that stores the request; and an output buffer that stores a response to the request, the response including a third variable-length string, the processing units generating the response by executing a routine of functional-level instructions.

* * * * *